(12) United States Patent
Tiedemann

(10) Patent No.: US 6,345,918 B1
(45) Date of Patent: Feb. 12, 2002

(54) MIRROR-REFLEX CAMERA

(75) Inventor: Joerg Tiedemann, Braunschweig (DE)

(73) Assignee: Rollei Fototechnic GmbH, Braunschweig (DE)

( * ) Notice: Subject to any disclaimer, the term of this patent is extended or adjusted under 35 U.S.C. 154(b) by 0 days.

(21) Appl. No.: 09/433,339

(22) Filed: Nov. 4, 1999

(30) Foreign Application Priority Data

Nov. 4, 1998 (DE) .......................... 198 50 819

(51) Int. Cl.[7] ................................ G03B 19/12
(52) U.S. Cl. ........................... 396/358; 396/447
(58) Field of Search ................ 396/354, 355, 396/358, 447

(56) References Cited

U.S. PATENT DOCUMENTS

| | | | |
|---|---|---|---|
| 3,852,791 A | 12/1974 | Eukuda | 354/152 |
| 4,033,693 A | * 7/1977 | Payrhammer et al. | 396/463 |
| 4,264,171 A | 4/1981 | Hahn et al. | 354/152 |
| 4,659,202 A | 4/1987 | Sadre-Marandi et al. | 354/152 |
| 4,750,012 A | 6/1988 | Lindenfelser | 354/152 |
| 4,757,387 A | 7/1988 | Saito | 358/225 |
| 4,839,679 A | * 6/1989 | Cameron et al. | 396/463 |
| 5,715,003 A | 2/1998 | Kanno | 348/341 |
| 5,758,217 A | 5/1998 | Mielke | 396/358 |

FOREIGN PATENT DOCUMENTS

| | | |
|---|---|---|
| DE | 195 31 206 | 2/1996 |
| DE | 44 47 092 | 7/1996 |

* cited by examiner

*Primary Examiner*—David M. Gray
(74) *Attorney, Agent, or Firm*—Foley & Lardner

(57) ABSTRACT

A mirror-reflex camera is provided having a viewfinder mirror which can be displaced between a viewing position and a taking position, and an electromagnetic drive for adjusting the viewfinder mirror. The viewfinder mirror can be displaced linearly between the viewing position and the taking position to ensure the quick and reliable adjustment of the viewfinder mirror between the viewing position and taking position, with a relatively low outlay and little expenditure of energy. The electromagnetic drive has a permanent magnet arrangement and a linearly displaceable plunger coil arrangement. The viewfinder mirror is displaceable, in particular, via a driver with the plunger coil arrangement.

10 Claims, 2 Drawing Sheets

MIRROR-REFLEX CAMERA

BACKGROUND OF THE INVENTION

Field of the Invention

The invention relates to a mirror-reflex camera having a viewfinder mirror which can be displaced linearly between a viewing position and a taking position, an electromagnetic drive being provided for displacing the viewfinder mirror.

Conventional devices may be gathered, for example, from DE 195 31 206 A1, U.S. Pat. No. 4,750,012 and U.S. 4,659,202. In these conventional devices, the electromagnetic drive for displacing the viewfinder mirror is constructed as an electric motor, or else as a moving-coil drive.

SUMMARY OF THE INVENTION

According to an embodiment of the present invention, a mirror-reflex camera comprises a viewfinder mirror that is linearly displaceable between a viewing position and a taking position and an electromagnetic drive for displacing the viewfinder mirror. The electromagnetic drive includes a permanent magnet arrangement permanently arranged on a housing side and a linearly displaceable plunger coil arrangement. The permanent magnet arrangement comprises at least one permanent magnet system having a magnet pot and a magnet core connected to and arranged radially in the magnet pot. A radial interspace is formed between the magnet pot and the magnet core in which flux lines of a magnetic field run radially. The plunger coil arrangement is axially displaceable.

One object of the present invention is to make available an improved electromagnetic drive which, in particular, permits reliable and quick displacement of the viewfinder mirror with a low outlay of energy.

This object is achieved according to the invention by virtue of the fact that the electromagnetic drive is formed by a permanent magnet arrangement permanently arranged on the housing side and a linearly displaceable plunger coil arrangement. The permanent magnet arrangement comprises at least one permanent magnet system which has a magnet pot and a magnet core which is arranged radially in the magnet pot and connected to it, there being formed between the magnet pot and the magnet core a radial interspace in which the flux lines of the magnetic field run at least essentially radially. The plunger coil arrangement is arranged in an axially displaceable fashion.

According to the invention, the electromagnetic drive is therefore utilized directly to displace the viewfinder mirror, it being possible to dispense with a complicated mechanical positive guidance and mechanical kinematics for deflecting the movement of the electric drive. As a result, the costs of production and assembly are reduced, durability is lengthened and the speed of the changeover operation is increased. Moreover, the outlay on energy for displacing the mirror is kept low. Since the total mass moved can be kept small, the mechanical loads on the moved parts as well as on the adjoining stationary ones are low during the processes of acceleration and braking. The outlay required for the electric supply is kept relatively low by the use of the permanent magnet arrangement; electric energy need only be supplied for the linear displacement of the plunger coil arrangement.

According to another embodiment of the present invention, use is made of a permanent magnet system with a magnet pot and a magnet core arranged radially in it, where the magnetic field lines run radially between the magnet core and the pot wall. In particular, the magnetic poles of the permanent magnet system are situated at the outer axial ends of the magnet core and the pot wall so that a closed magnetic field can be achieved, in which relatively little magnetic flux runs outside the permanent magnet system and interacts electromagnetically with the environment. An efficient utilization of the magnetic flux inside the permanent magnet system can be achieved by a plunger coil system arranged around the magnet core.

For this purpose, according to yet another embodiment of the present invention, it is advantageously possible to make use of two permanent magnet systems each having a magnet pot and radially inwardly situated magnet core which are arranged essentially in a mirror-symmetric fashion relative to one another and bear against one another with their axial ends. A high magnetic flux-line density is thereby ensured by the two permanent magnet systems in a central inner region of the permanent magnet arrangement.

The viewfinder mirror can be linearly displaced with the plunger coil arrangement via a mirror support fastened on the plunger coil arrangement. As a result, the total mass of the viewfinder mirror, mirror support and plunger coil arrangement that is to be moved is relatively low, since no further mechanical parts required, for example, for a deflecting movement or positive guidance, need to be moved as well and thus accelerated and/or braked. The mirror support can, for example, project through a cut-out or an elongated hole in the magnet pots, and thus permit a reliable connection between the plunger coil arrangement and the viewfinder mirror. In this case, the mirror support can also advantageously be used for feeding current, for example by a flexible conductor track, to the plunger coil arrangement, with the result that no further mechanical part is required for this purpose, as well.

The fact that the viewfinder mirror can be displaced rigidly with the mirror support and that the latter, in turn, can be displaced via the plunger coil arrangement, eliminates the requirement of having to provide some sort of flexible connections which can possibly lead to maladjustment of the viewfinder mirror, and thus of the entire optical system.

The plunger coil arrangement can be implemented, in particular, as a sleeve constructed concentrically about the magnet core, and a plunger coil winding arranged on the sleeve, preferably on the outside of the sleeve.

Further features of the invention form the subject matter of the claims and will be explained in more detail, in conjunction with further advantages of the invention, with reference to exemplary embodiments.

BRIEF DESCRIPTION OF THE DRAWINGS

Embodiments of the invention, serving as examples, are illustrated schematically in the drawings, in which.

DETAILED DESCRIPTION OF THE PREFERRED EMBODIMENTS

The present invention relates to a mirror-reflex camera having a viewfinder mirror which can be displaced linearly between a viewing position and a taking position, where an electromagnetic drive is provided for displacing the viewfinder mirror.

Figure 1:
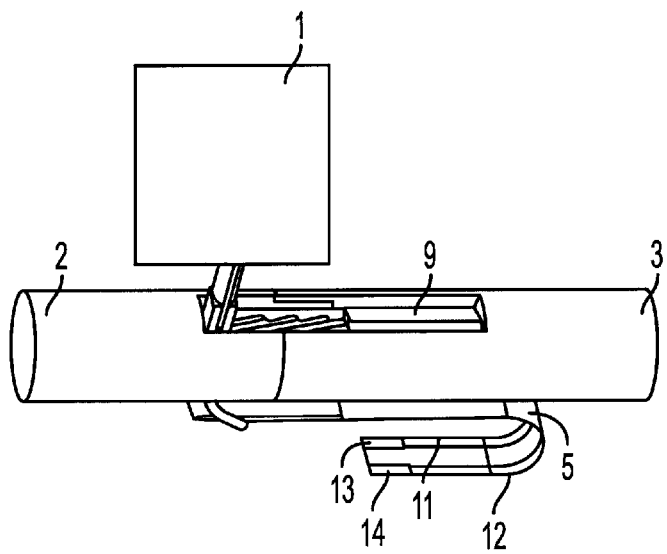
FIG. 1 shows a perspective view of a drive arrangement with a viewfinder mirror of a mirror-reflex camera in accordance with an embodiment of the invention.
Figure 2:
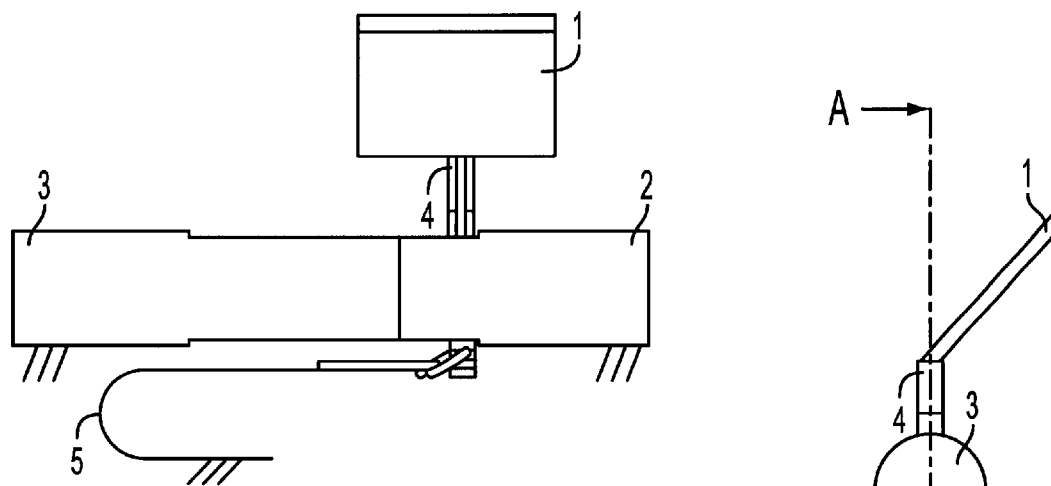
FIG. 2 shows a rear view of the arrangement from FIG. 1.
Figure 3:
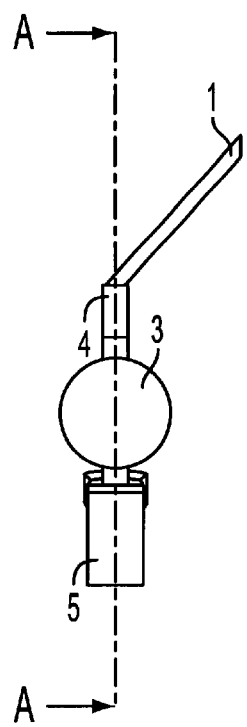
FIG. 3 shows a side view of the arrangement from FIGS. 1 and 2.

An embodiment of the present invention is shown in FIG. 1. A viewfinder mirror 1 is fitted in a drive arrangement via a mirror support 4. The installation of the viewfinder mirror together with the drive arrangement is usually performed in the mirror-reflex camera in such a way that the viewfinder mirror is arranged at an angle of 45° in the beam path coming from the lens, and thus permits a deflection of the beam path by 90° in a viewing position. In a taking position, the viewfinder mirror is removed from the beam path. The mirror is respectively arranged in a first position in FIGS. 1 to 4, which can represent a viewing position, for example.

Figure 4:
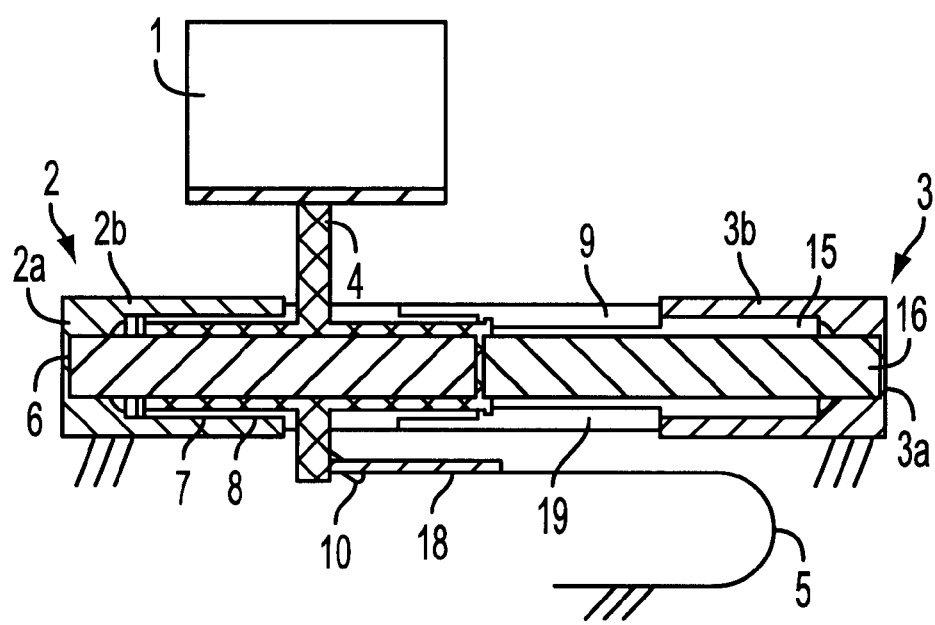
FIG. 4 shows a front view in the axial section A—A of the arrangement from FIG. 3.

In the electromagnetic drive arrangement, a first permanent magnet system having a first magnet pot 2, shown on the left in FIG. 4, and a first magnet core 6, and a second permanent magnet system having a second magnet pot 3, shown on the right in FIG. 4, and a second magnet core 16 are provided, which are contiguous in an axial direction. The axially extending magnet cores 6 and 16 are connected to bottom pieces 2a and 3a of the first and second magnet pots. This connection can advantageously be made by bonding.

A common radial interspace 15 is formed between the pot walls 2b, 3b and the radially inwardly situated magnet cores 6, 16. In each of the two permanent magnet systems, one magnetic pole is constructed at the axially inwardly situated end of the respective magnet core 6 or 16, and the other pole is constructed on the axially inwardly situated end of the pot wall 2b or 3b, with the result that a radially running magnetic flux is formed in the interspace 15 which is particularly large in the central region of the permanent magnet arrangement. Like poles, for example north poles, are situated respectively at the axial ends of the magnet cores 6, 16, and like poles, for example south poles, are situated on the axial ends of the pot walls 2b, 3b and thus axially next to one another.

An external magnetic field is therefore kept low, so that there is relatively little magnetic interaction with the outside. Arranged in the common radial interspace 15 is the plunger coil arrangement, which has a sleeve 7 arranged at least essentially concentrically about the magnet cores 6, 16, as well as a plunger coil winding 8 connected to the sleeve. The plunger coil winding can, in particular, be arranged on the outside of the sleeve and be fastened by a conventional fastener, such as an adhesive or a lacquer. The plunger coil winding can be of one or more layers, it being possible to achieve a relatively small interspace 15 when using only one plunger coil winding. The sleeve 7 can be displaced linearly together with the plunger coil winding 8 in the axial direction, since the sleeve 7 does not extend over the entire length of the magnet cores 6, 16. The sleeve 7, which comprises a plastic, or the like, can be guided directly on the magnet cores 6, 16.

The mirror support 4 is connected to the sleeve 7, for example at its axial center. The connection can be performed via a driver fastened on the sleeve. The mirror support 4 can comprise a non-magnetic material such as, for example, a plastic, such as polycarbonate. Formed in the magnet pot walls 2b, 3b on two radially opposing sides are cut-outs 9, 19 through which the mirror support 4 can project in all positions along the linear displaceability of the sleeve 7.

Current can be fed through the second cut-out 19 via the lower end of the mirror support 4. This feeding of current to the mirror support can advantageously be performed by a flexible conductor track 5 on which, in accordance with FIG. 1, terminal contacts 13, 14 are provided for two current conductors 11, 12 which, via contact pins 10, permit current to be fed to the plunger coil winding 8, for example through a groove in the mirror support 4. By virtue of the fact that the polarity of the DC terminal can be reversed at the terminal contacts 13 and 14, the direct changeover of the current flowing through the plunger coil winding 8, and thus of the magnetic flux generated by it, are achieved, with the result that the electromotive force exerted on the plunger coil winding 8 can be changed over correspondingly. Since the magnetic flux through the radial interspace 15 takes place in the radial direction between the pot walls 2b, 3b and the magnet cores 6, 16, and that the current through the plunger coil winding 8 wound around the sleeve 7 flows in the circumferential direction around the magnet cores 6, 16, the electromotive force exerted on the plunger coil winding 8 points in the axial direction. Consequently, a direct linear movement in the axial direction to the left or right in FIG. 4 can be achieved by appropriately changing over at the terminal contacts 13, 14, there being no need in each case for positive guidance.

Setting at rest in the first position shown in FIG. 4, and in the corresponding second position, in the case of which the mirror support 4 in FIG. 4 is to be arranged on the right-hand edge of the cut-out 9, can be performed in principle at zero current if adequate protection of the two positions can be achieved, or else with an appropriate passage of current. The two positions of the mirror support 4 in the viewing position or taking position can be achieved by a stop of the mirror support 4 on the pot walls 2b and 3b and/or a stop of the axial ends of the sleeve 7 on the bottom pieces 2a, 3a of the magnet pots 2 and 3.

The contact pins 10 make the electric connection between the plunger coil winding 8 and the current conductors 11, 12 located in the conductor track 5. A protective lug 18 prevents the conductor track 5 from rubbing against the outer wall of the magnet pots 2, 3 and wearing during the drive movement.

The arrangement shown can be assembled, for example, by pushing the sleeve 7, provided with the plunger coil winding 8, over one of the two magnet cores 6, 16, which has previously been connected by bonding to the relevant magnet pot 2 or 3. The magnet pots with internally situated magnet cores which have been magnetized together are subsequently bonded to one another or are fastened directly in the camera housing.

Since the cut-outs 9, 19 extend over both pot walls 2b, 3b, appropriate cut-outs can be recessed, for example milled directly into the pot walls 2b, 3b.

The magnet coils advantageously in this case can comprise a magnetically hard material, and the magnet pots can comprise a magnetically soft material.

Although the invention has been described above by reference to certain embodiments of the invention, the invention is not limited the embodiments described above. Modifications and variations of the embodiments described above will occur to those skilled in the art, in light of the above teachings. The scope of the invention is defined with reference to the following claims.

German Patent Application No. 198 50 819.0, filed Nov. 4, 1998, including the specification, the drawings, the claims, and the abstract, upon which this application is based, is incorporated herein by reference in its entirety. The U.S. Patent Application naming E. Scholz and J. Tiedemann as inventors, entitled "Mirror Reflex Camera," filed on the same date as the present application, is incorporated by reference in its entirety.

What is claimed is:

1. A mirror-reflex camera, comprising:
   a viewfinder mirror linearly displaceable between a viewing position and a taking position; and
   an electromagnetic drive for displacing the viewfinder mirror, wherein the electromagnetic drive includes:
   a permanent magnet arrangement permanently arranged on a housing side, and
   a linearly displaceable plunger coil arrangement, said permanent magnet arrangement comprising at least one permanent magnet system having a magnet pot and a magnet core connected to and arranged radially in said magnet pot, wherein a radial interspace is formed between said magnet pot and said magnet core in which flux lines of a magnetic field run radially, and wherein said plunger coil arrangement is axially displaceable,
   wherein said permanent magnet arrangement comprises two permanent magnet systems, each of said magnet systems having a magnet pot and a radially inwardly situated magnet core, wherein said magnet pots and said radially inwardly situated magnet cores extend in a common axial direction, and wherein axial ends of said magnet cores adjoin one another.

2. The mirror-reflex camera according to claim 1, wherein the viewfinder mirror is rigidly fastened on a mirror support which is displaceable by said plunger coil arrangement.

3. The mirror-reflex camera according to claim 1, wherein axial ends of walls of said magnet pots are contiguous, and wherein a common radial interspace is formed between said magnet pots and said magnet cores.

4. The mirror-reflex camera according to claim 1, wherein magnetic flux lines at facing ends of said permanent magnet systems run substantially parallel to one another and in a straightened fashion.

5. The mirror-reflex camera according to claim 1, further comprising:
   an axially extending free space formed in the walls of said magnet pots; and
   a mirror support fastened on said plunger coil arrangement projectable through said axially extending free space.

6. The mirror-reflex camera according to claim 1, wherein said plunger coil arrangement comprises a sleeve arranged concentrically with said magnet core.

7. The mirror-reflex camera according to claim 6, further comprising an external plunger coil winding fastened on said sleeve.

8. The mirror-reflex camera according to claim 1, further comprising:
   a flexible conductor track for feeding current to said plunger coil arrangement.

9. The mirror-reflex camera according to claim 8, further comprising:
   contact pins for electrically connecting said flexible conductor track to said plunger coil arrangement.

10. The mirror-reflex camera according to claim 5, wherein a flexible conductor track for feeding current to said plunger coil arrangement is connected to said mirror support of said viewfinder mirror, said mirror support having current leads to said plunger coil arrangement.

* * * * *